United States Patent [19]

Maslanka

[11] 4,388,439

[45] Jun. 14, 1983

[54] WET-STRENGTH RESIN FOR PAPER AND METHOD OF PREPARING SAME

[75] Inventor: William W. Maslanka, London-Britain Township, Chester County, Pa.

[73] Assignee: Hercules Incorporated, Wilmington, Del.

[21] Appl. No.: 314,909

[22] Filed: Oct. 26, 1981

Related U.S. Application Data

[63] Continuation-in-part of Ser. No. 761,101, Jan. 21, 1977, abandoned, which is a continuation-in-part of Ser. No. 554,999, Mar. 3, 1975, abandoned.

[51] Int. Cl.³ .............................................. C08L 77/06
[52] U.S. Cl. ................................. 524/845; 162/164.3; 524/608; 528/341

[58] Field of Search ................... 260/29.2 EP, 29.2 N; 524/608, 845; 523/402; 528/341

[56] References Cited

U.S. PATENT DOCUMENTS 2,926,154 2/1960 Keim ................................ 260/29.2

FOREIGN PATENT DOCUMENTS 934892 10/1973 Canada .

*Primary Examiner*—Theodore E. Pertilla

[57] ABSTRACT

Disclosed are novel wet-strength resins for paper, said resins being derived by reacting an epihalohydrin, such as epichlorohydrin, with a polyaminopolyamide derived by reaction of a diester of oxalic acid, such as diethyl oxalate, and methylbisaminopropylamine.

15 Claims, No Drawings

WET-STRENGTH RESIN FOR PAPER AND METHOD OF PREPARING SAME

This is a CIP of application Ser. No. 761,101, filed Jan. 21, 1977, now abandoned. Ser. No. 761,101 is a CIP of Ser. No. 554,999, filed Mar. 3, 1975, now abandoned.

This invention relates to a new wet-strength resin for paper. Particularly, this invention relates to a wet-strength resin for use in the manufacture of wet-strength paper, the broke of which can be easily and readily repulped.

Broke is a waste product of the paper industry which, if not recovered and utilized, represents a substantial loss. It is customary to repulp the broke and reuse it in the papermaking process. Wet-strength broke is difficult to repulp. A process for repulping wet-strength broke is described in U.S. Pat. No. 3,427,217.

It has been found that repulping of wet-strength broke is facilitated when the wet-strength resin of this invention is employed in the manufacture of wet-strength paper.

Cationic, water-soluble, thermosetting resins derived by the reaction of amino polymers with epichlorohydrin are known wet-strength resins for paper. Typical of these wet-strength resins are the resins of U.S. Pat. No. 2,926,154. This patent discloses resins derived by the reaction of epichlorohydrin and an aminopolyamide derived from a polyalkylene polyamine and a $C_3$ to $C_8$ saturated aliphatic dicarboxylic acid such as malonic acid, adipic acid and the like. Australian patent No. 244,892 to Aldrich et al discloses resins derived by reaction of epichlorohydrin and an aminopolyamide derived from malonic acid and N-bis(aminopropyl)-methylamine, also known as methylbisaminopropylamine. See also Canadian Pat. No. 934,892 which discloses the use of diesters derived from $C_3$ to $C_6$ saturated aliphatic dicarboxylic acids in the preparation of an aminopolyamide which is subsequently reacted with epichlorohydrin. In the wet-strength resin art the amino polymers derived from a polyalkylene polyamine and a dicarboxylic acid are known as polyaminopolyamides and are sometimes referred to as "amino-polyamides" and "polyamides". Other patents which describe cationic, thermosetting, wet-strength resins for paper are 3,224,990, 3,240,664, 3,332,901, and 3,700,623.

In accordance with this invention there is provided a new wet-strength resin. The new resin is derived by reacting an epihalohydrin, such as epichlorohydrin, with a polyaminopolyamide derived by reaction of a diester of oxalic acid and methylbisaminopropylamine. The preferred diesters are those derived from oxalic acid and $C_1$-$C_3$ saturated aliphatic monohydric alcohols such as methanol, ethanol, propanol, and isopropanol. Specific examples of diesters are dimethyl oxalate, diethyl oxalate, and dipropyl oxalate.

In the preparation of the resin of this invention the diester of oxalic acid is first reacted with methylbisaminopropylamine to produce a long chain water-insoluble polyaminopolyamide containing the recurring group:

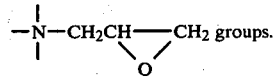

The polyaminopolyamide, in the form of its acid salt, is then reacted in aqueous medium with an epihalohydrin to form a water-soluble cationic thermosetting resin.

The other reactant used in preparing the polyaminopolyamide is methylbisaminopropylamine, also referred to in the art as N-bis(aminopropyl)methylamine, which has the formula

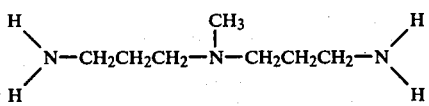

Reaction of the diester of oxalic acid and the amine is carried out neat or in a solution of the two reactants in an alcohol-water mixture such, for example, as a mixture of, by weight, 50 parts ethanol and 50 parts water. Temperatures employed in the reaction can vary between about 110° C. and about 200° C. Preferred temperature range is about 160° C. to about 195° C. Time of reaction depends on temperature and is inversely proportional thereto. Reaction time will vary from about ½ hour to two hours.

In carrying out the reaction, it is preferred to use an amount of diester sufficient to react substantially completely with the primary amine groups of the amine. This will usually require a mole ratio of amine to diester of from about 0.9:1 to about 1.2:1. The preferred mole ratio is about 1:1.

In converting the polyaminopolyamide to a water-soluble cationic thermosetting resin, the water-soluble acid salt thereof is first prepared and then reaction with epihalohydrin carried out.

The acid salt of the polyaminopolyamide is easily and readily prepared by adding to an aqueous dispersion of the polyaminopolyamide a water-soluble acid such as hydrochloric acid in an amount essentially stoichiometrically equivalent to the tertiary amines of the polyaminopolyamide whereby essentially all the tertiary amines are converted to the acid salt. Suitable acids for salt formation are water-soluble, are within the skill of the art and include inorganic acids such as sulfuric acid, hydrochloric acid, nitric acid, phosphoric acid and organic acids such as acetic acid.

Thus, in converting the polyaminopolyamide to a cationic thermosetting resin, it is reacted in aqueous solution in the form of its acid salt, with an epihalohydrin, preferably epichlorohydrin, at a temperature from about 45° C. to about 100° C. and preferably from about 45° C. to 70° C. until the viscosity of a 25% solids solution at 25° C. has reached about E-F or higher on the Gardner-Holdt scale. pH adjustment is usually not necessary during reaction. However, since the pH decreases during the reaction it may be desirable in some cases to add alkali to combine with at least some of the acid formed. When the desired viscosity is reached, sufficient additional water is added to adjust the solids content of the resin solution to about 15% or less and the product cooled to room temperature, about 25° C. The resin will contain a plurality of reactive

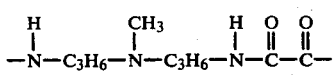 groups.

In the polyaminopolyamide-epihalohydrin reaction, it is preferred to use sufficient epihalohydrin to convert all tertiary amine groups to quaternary ammonium groups. Satisfactory resins can be prepared by using from about 1 mole to about 1.5 moles of epihalohydrin per mole tertiary amine of the polyaminopolyamide.

The resin is stabilized against premature gelation by converting essentially all the reactive

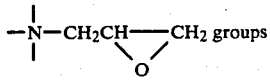

to inactive

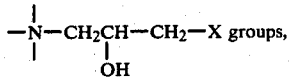

X being the halogen of the epihalohydrin. X will be Cl when the epihalohydrin is epichlorohydrin.

The stabilization is accomplished by adding a water-soluble acid to the resin solution until essentially all the reactive groups are changed to the inactive form. This is accomplished by adding sufficient water-soluble acid to obtain and maintain a pH of from about 2 to 3. The reactive groups are thereby changed to the inactive form and the resin solution will be stabilized against gelation. When the pH remains at the desired pH for a period of about two hours at room temperature (about 25° C.) it is relatively certain that the pH will not change and the resin solution is stabilized against gelation. By this means, stable solutions having a resins solids content of from about 10% to about 50% can be prepared.

Acids that can be employed in the above stabilization procedure are water-soluble acids such as hydrochloric acid, hydrobromic acid, hydrofluoric acid, hydroiodic acid, sulfuric acid, nitric acid, phosphoric acid, acetic acid. Mixtures of two or more water-soluble acids can be used if desired.

Prior to use in the paper mill the resin is "reactivated" by adjusting the pH of the resin solution to and maintaining it above about 8, preferably 10.5 and higher. Preferred pH range is 10.5 to 11. This reconverts essentially all the inactive

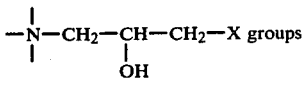

to the reactive cross-linking

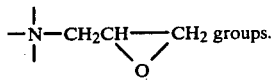

This pH adjustment is made by the addition of a suitable organic or inorganic base such as the alkali metal hydroxides, carbonates, calcium hydroxide, benzyltrimethylammonium hydroxide, and tetramethylammonium hydroxide. The alkali metals include sodium, potassium, cesium and lithium. The base is added preferably as an aqueous solution.

At a pH of 2 to 3 the water-soluble resin will contain the following recurring groups:

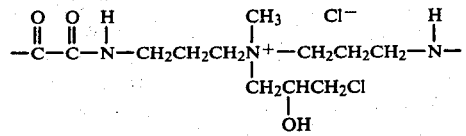

The polyamide-epichlorohydrin resins, prepared as herein described, may be incorporated into pulp slurry at any point on the wet end of the paper machine. However, prior to use, they must be activated as above set forth to convert the halohydrin groups to epoxides whereby the resin will contain the following recurring group:

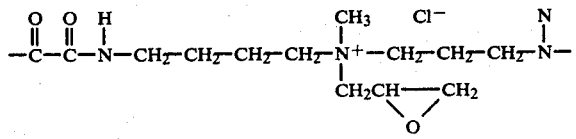

The resins of this invention exhibit high "off-the-machine" wet strength and moderate dry strength. For most purposes, adequate wet strength may be obtained by incorporating in the paper from about 0.25% to about 3% of the resin based on the dry weight of the pulp.

The following examples illustrate the invention.

EXAMPLE 1

Methylbisaminopropylamine (MBAPA), 145.3 grams (1 mole) was placed into a reaction vessel and heated to 160° C. Diethyl oxalate 146.0 grams (1 mole) was added dropwise keeping the temperature of the reaction mass between about 160° C. and about 170° C. After the addition was complete the temperature of the reaction mass was allowed to rise to about 190°–195° C. over a period of about 20 minutes. A very viscous polyaminopolyamide resulted which was poured into an aluminum pan. The yield of polyaminopolyamide was 191 grams and it had an I.V. (intrinsic viscosity) of 0.92 at 25° C., measured as a 1% solution in m-cresol.

EXAMPLE 2

60 Grams of the polyaminopolyamide of Example 1, 147 cc of water, and 29.5 grams of 37.3% aqueous HCl were thoroughly admixed to provide a 30.2% aqueous solution of the resulting salt, the pH of the solution being about 3.3. 58.2 Grams of the 30.2 aqueous solution (17.75 grams, 0.075 mole, of resin solids) was placed into a reaction vessel and the pH of the solution adjusted to 7.9 with 5 molar NaOH. Epichlorohydrin, 10.4 grams (0.113 mole) was added together with 43 cc of water to give 25% solids. The temperature of the resulting solution which was at room temperature (about 25° C.), was raised to 50°–53° C. and the viscosity of the solution monitored. When the Gardner-Holdt viscosity reached F, 134 cc water was added and the pH was adjusted to 2 with 10 molar HCl. Periodic pH adjustments were made until the pH of 2 was constant for about 60 minutes. The resulting solution had a solids content of about 8.8 by weight.

EXAMPLE 3

100 Grams of the solution of Example 2 was diluted to about 3% by adding and admixing therewith 194 cc of water. To this was added, with mixing, 1.6 grams of sodium hydroxide dissolved in 96 cc of water. The resulting solution had a resin solids content of about 2% and a pH of about 11.4.

EXAMPLE 4

A 50:50 by weight mixture of Rayonier bleached kraft pulp and Weyerhauser bleached hardwood pulp was beaten to Canadian standard freeness of 500 cc in a Noble and Wood cycle beater. The pulp was then adjusted to pH 7.5 with 10% NaOH and varying amounts, as specified in Table I, based on the dry weight of pulp of the polyaminopolyamide—epichlorhydrin resin, prepared as described in Example 2, were added by using the solution of Example 3. The pulp was sheeted on a Noble and Wood handsheet machine. A portion of the resulting handsheets were given a cure of 30 minutes at 80° C. The sheets tested for wet strength were soaked for two hours in distilled water. Results are listed in Table I.

TABLE I

| % of Resin Added | Basis Weight | Tensile Strength (lbs/in) | | | |
|---|---|---|---|---|---|
| | | Dry | | Wet | |
| | | Uncured | Cured | Uncured | Cured |
| 0.25 | 39.8 | 17.1 | 18.4 | 3.13 | 3.77 |
| 0.5 | 39.4 | 17.8 | 19.9 | 3.78 | 4.50 |
| 1. | 40.0 | 17.6 | 18.8 | 4.61 | 5.02 |

EXAMPLE 5

Example 4 was repeated. Results are set forth in Table II.

TABLE II

| % of Resin Added | Basis Weight | Tensile Strength (lbs/in) | | | |
|---|---|---|---|---|---|
| | | Dry | | Wet | |
| | | Uncured | Cured | Uncured | Cured |
| 0.25 | 39.9 | 19.6 | 20.2 | 3.62 | 4.10 |
| 0.5 | 39.8 | 18.8 | 19.9 | 4.69 | 5.02 |
| 1. | 40.1 | 19.9 | 22.0 | 5.15 | 5.49 |

EXAMPLE 6

Paper was prepared in accordance with the method of Example 4, using 1% resin based on the dry weight of the pulp. The paper was repulped in aqueous NaOH at a pH of about 12 and at a temperature of about 185° F. Degree of repulping of the paper containing the uncured resin is set forth in Table III below. In the table the degree is measured in integers 1–6, the integer 6 indicating substantially complete repulping. Thus, as shown in the table, after 60 minutes there was substantially complete repulping.

TABLE III

| % of Resin Added | Tensile Strength (lbs/in) | | | | Degree of Repulping After Minutes | | | | | | |
|---|---|---|---|---|---|---|---|---|---|---|---|
| | Dry | | Wet | | | | | | | | |
| | Uncured | Cured | Uncured | Cured | 5 | 10 | 20 | 30 | 40 | 50 | 60 |
| 1 | 21.0 | 19.6 | 5.34 | 5.84 | 1 | 1 | 3 | 5 | 5 | 5 | 6 |

EXAMPLE 7

The apparatus employed in this example was a 1 liter resin kettle (reaction flask) with head fitted with a Dean-Stark trap, a water condenser, a nitrogen sparge, an anchor stirrer, and a thermometer.

Methylbisaminopropylamine, 145.3 grams (1 mole), was placed in the resin kettle and heated to 160° C. Diethylmalonate, 160.2 grams (1 mole), was then added to the resin kettle dropwise keeping the temperature of the reaction mass between about 160° C. and 163° C. After addition was complete (about 13 minutes), the temperature of the reaction mass was allowed to rise to about 191° over a period of about 65 minutes. The polyaminopolyamide reaction product was poured into an aluminum pan and cooled to room temperature (about 25° C.). The yield of polyaminopolyamide was 201 grams.

EXAMPLE 8

46 Grams of the polyaminopolyamide of Example 7, 112 cc of water, and 22.7 grams of 37.3% aqueous HCl were thoroughly admixed to provide 31.3% aqueous solution of the resulting salt, the pH of the solution being about 1.5. 78.65 Grams of this solution was placed into a reaction flask fitted as in Example 7. The pH of the solution was adjusted to 8.7 by adding 3.8 cc of 10 molar NaOH. Epichlorohydrin, 13.7 grams, was added followed by 31 cc of water to give 30% reaction solids. The temperature of the resulting solution, which was at room temperature (about 25° C.), was raised to 50°–52° C. and the viscosity of the solution monitored. When the Gardner-Holdt viscosity reached F, 209 cc of water was added and the pH was adjusted to 1 with 10 molar HCl. The pH subsequently increased to 6.4 and was adjusted to 1.4 by the addition of 1.1 cc of 10 molar HCl. The resulting solution had a solids content of about 10% by weight.

EXAMPLE 9

100 Grams of the solution of Example 8 was diluted to about 3% solids by adding and admixing therewith 233 cc of water. To this was added, with mixing, 1.45 grams of sodium hydroxide dissolved in 114 cc of water. The resulting solution had a resin solids content of about 2% and a pH of about 11.

EXAMPLE 10

Using the resin solution of Example 9, paper sheets were prepared and the wet-strength properties thereof were tested in accordance with the procedure of Example 4. Strength properties of the resin prepared in accordance with Examples 7 and 8 are set forth in Table IV below.

TABLE IV

| % of Resin Added | Basis Weight | Tensile Strength (lbs/in) | | | |
|---|---|---|---|---|---|
| | | Dry | | Wet | |
| | | Uncured | Cured | Uncured | Cured |
| 0.25 | 40.6 | 18.6 | 19.1 | 3.60 | 3.95 |
| 0.50 | 39.9 | 21.6 | 21.3 | 4.79 | 5.30 |
| 1.0 | 40.7 | 21.7 | 22.3 | 5.53 | 6.43 |

EXAMPLE 11

Degree of repulping of the paper prepared in accordance with Example 10 was determined in accordance with the procedure of Example 6. Degree of repulping of the paper containing the uncured resin is set forth in Table V below.

TABLE V

| % of Resin Added | Tensile Strength (lbs/in) | | | | Degree of Repulping After Minutes | | | | | | |
|---|---|---|---|---|---|---|---|---|---|---|---|
| | Dry | | Wet | | 5 | 10 | 20 | 30 | 40 | 50 | 60 |
| | Uncured | Cured | Uncured | Cured | | | | | | | |
| 0.5 | 19.4 | 20.5 | 4.53 | 5.18 | <1 | <1 | <1 | 1 | 2 | 2 | 2 |

EXAMPLE 12

Methyl bis(3-aminopropyl) amine (218.0 g., 1.50 moles) was charged to a resin kettle equipped with anchor stirrer, thermometer, nitrogen sparge, and Dean-Stark water trap with condenser. The amine was heated to 160° C., and diethyl oxalate (219.0 g., 1.50 moles) was added dropwise during 67 minutes while the temperature was maintained between 155° and 174° C. After ester addition was complete, the polyamide melt was held between 170° and 176° C. for 33 minutes, then decanted and cooled. The polyamide had a reduced specific viscosity ($\eta sp/c$)=0.803 in m-cresol, as determined at c=2 g/100 ml. at 25° C.

Sixty grams of the MBAPA-oxalic polyamide described above was dissolved in a solution of 29.5 g. 37% hydrochloric acid and 147 ml. of water. A 55.8 g. portion of this solution (representing 14.15 g. of polyamide, 6.95 g. 37% hydrochloric acid and 34.7 ml. H$_2$O) was charged to a flask equipped with a stirrer, thermometer, and reflux condenser. It was adjusted from pH 6.5 to about pH 8 with 30 ml. (31.4 g.) of 4% sodium hydroxide, and diluted with 16 ml. additional water. The resulting solution was then warmed to 32° C., then 10.4 g. epichlorohydrin was added during 8 minutes. The resulting mixture was held between 46° and 55° C. for 44 minutes, during which the Gardner-Holdt viscosity rose to F (sample cooled to 25° C.). The resin solution was then diluted with 134 g. water and adjusted to pH 2 with 0.5 ml. (0.59 g.) 37% hydrochloric acid. The resin was then heated to 80° C. and maintained there for 108 minutes while 37% hydrochloric acid was added on demand to maintain pH near 2. A total of 4.5 ml. (5.35 g.) 37% HCl was added during this stabilization step. The resulting solution contained about 10.3% non-volatile solids and had a Brookfield viscosity of about 21 cps. (Brookfield viscometer model LVF, #2 spindle, 60 rpm, 25° C.).

Before addition to pulp for handsheet manufacture, the resin was base-activated as follows. A sample of resin was diluted to 5% solids content. With stirring, 1 N sodium hydroxide solution was slowly added until the pH reached 10.5. The resulting NaOH-activated resin solution was aged for 5 minutes, then diluted to 2% solids before addition to the handsheet machine.

EXAMPLE 13

Methyl bis(3-aminopropyl) amine (145.3 g., 1.00 mole) was charged to a one-liter resin kettle equipped with anchor stirrer, thermometer, nitrogen sparge, and Dean-Stark water trap with condenser. The amine was heated to 160° C., then 160.2 g. (1.00 mole) diethyl malonate was added dropwise during 15 minutes. After the addition was complete, the reaction mixture was maintained between 155°–166° C. for 1 hour, during which 112 ml. of distillate (equivalent to ca. 88.4 parts by weight, of ethanol) was collected. The polymer melt was poured into a pan and allowed to cool. The polyamide had an intrinsic viscosity=0.43, as measured using a solution in m-cresol at 25° C., 1 g./100 ml.

Forty-six grams of the MBAPA-malonic polyamide described above was dissolved in a mixture of 22.7 g. of 37.3% hydrochloric acid and 112.0 g. of water. The resulting pH was 7.25. A 78.65 g. portion of the above solution (representing 20.0 g. polymer, 9.9 g. 37.3% hydrochloric acid and 48.8 g. water) and 29.8 g. additional water were charged to a flask equipped with stirrer, thermometer and reflux condenser. The solution was adjusted to pH 8.8 with 5.0 ml. (7.6 g.) of 35% (wgt/wgt) sodium hydroxide, then 13.7 g. epichlorohydrin was added during 4 minutes. The reaction mixture was heated to 45° C., then maintained between 38° and 47° C. for 39 minutes, during which the Gardner-Holdt viscosity of the mixture rose to F+. (Sample cooled to 20° C.). The resin was diluted with 209 g. of dilution water, adjusted to pH 1.5 with 1.3 ml. (equivalent to 1.54 g.) 37% hydrochloric acid, cooled to 25° C., and adjusted to pH 1.0 with 0.8 ml. (0.95 g) additional 37% hydrochloric acid. The resulting resin solution contained about 10.3% non-volatile solids and had a Brookfield viscosity of 20.5 cps (Brookfield viscometer model LVF spindle, 60 rpm, 25° C.). The resin solution was readjusted to pH 1.5 the first and fourth days after manufacture, using a total of 3.1 ml. (3.68 g.) of 37% hydrochloric acid.

Before addition to pulp for handsheet manufacture, the resin was base-activated as follows. A sample was diluted to 5% solids content. With stirring, 1 N sodium hydroxide solution was slowly added until the pH reached 10.5. The resulting NaOH-activated resin solution was aged for 5 minutes, then diluted to 2% solids before addition to the handsheet machine.

EXAMPLE 14

A 50:50 blend of Rayonier bleached softwood kraft (RBK) pulp and Weyerhaeuser bleached hardwood kraft (WBHK) pulp was beaten at 2.5% consistency to 500 cc. Canadian Standard Freeness, at pH 7.5. Two thousand parts of this stock (50 parts of pulp solids) was diluted with water to a total of 18,000 parts in the proportioner of a Noble-Wood handsheet machine to give a ca. 0.28% pulp slurry. Handsheets were prepared from each of the base-activated resins of Examples 12 and 13 for comparative testing. The resins were added, as 2% aqueous solutions, in amounts calculated to give between 0.25% and 1.0% resin solids based on pulp solids. One thousand parts of the resin-treated 0.28% slurry was then diluted with 10,000 parts of water in the deckle box to a consistency of 0.025% and formed into handsheets. The handsheets were wet pressed to about 35% solids, and dried on a drum drier at 105°–110° C. for about 40 seconds. Dry tensile strengths were determined on an Amthor tensile tester after conditioning the sheets 24 hours at 73° F. at 50% relative humidity. Wet tensiles were determined after soaking tensile strips in distilled water for 2 hours. Test results are set forth in Table VI below.

TABLE VI

| Resin of | Addition, % of Pulp | B.W. lb/R | Uncured Tensile, lb/in | | Wet/Dry % |
|---|---|---|---|---|---|
| | | | Dry | Wet | |
| Example 12 | 0.25 | 39.3 | 20.3 | 2.61 | 12.9 |
| " | 0.5 | 39.4 | 20.3 | 2.92 | 14.4 |
| " | 0.75 | 39.2 | 20.2 | 2.86 | 14.2 |
| " | 1.0 | 39.7 | 21.0 | 3.01 | 14.3 |
| Example 13 | 0.25 | 39.7 | 21.6 | 2.95 | 13.7 |
| " | 0.5 | 39.5 | 21.2 | 3.13 | 14.8 |
| " | 0.75 | 39.4 | 21.3 | 3.48 | 16.3 |
| " | 1.0 | 39.7 | 18.7 | 3.25 | 17.4 |

EXAMPLE 15

Broke reworking experiments were conducted on the handsheets prepared in Example 14. Handsheet pieces were reworked in a TAPPI disintegrator, in water adjusted to pH 12 (NaOH) and heated to 185° F. The degree of defibering was checked every 10 minutes for 1 hour, then every 20 minutes thereafter to a limit of three hours. Test results are set forth in Table VII below.

TABLE VII

| | Resin of | | |
|---|---|---|---|
| | Example 12 | Example 13 | |
| Addition, % Pulp | 0.5 | 0.25 | 0.5 |
| Basis Wgt., lb/ream | 39.6 | 40.2 | 39.8 |
| Dry Tensile Strength lb/in. | 19.9 | 20.2 | 20.5 |
| Wet Tensile Strength, lb/in. | 2.85 | 2.61 | 3.03 |
| Wet/Dry Tensile, % | 14.3 | 12.9 | 14.8 |
| Time for Complete repulping, minutes | 20 | 80 | 160 |

EXAMPLE 16

55.8 Grams of polyaminopolyamide of Example 1, 137 cc of water, and 27.4 grams of 37.3% aqueous HCl were thoroughly admixed to provide a 29.9% aqueous solution of the resulting salt, the pH of the solution being about 2. 78.8 Grams of the 29.9% aqueous solution (23.55 grams, 0.1 mole, of resin solids) was placed into a reaction vessel and the pH of the solution adjusted to 7.5 with 5 molar NaOH. Epichlorohydrin, 13.88 grams (0.15 mole) was added together with 53 cc of water to give 25% solids. The temperature of the resulting solution which was at room temperature (about 25° C.) was raised to 48°–50° C. and the viscosity of the solution monitored. When the Gardner-Holdt viscosity reached E+, 224 cc water was added and the pH was adjusted to 2 with concentrated HCl. Periodic pH adjustments were made until the pH of 2 was constant for about 60 minutes. The resulting solution had a solids content of about 8.35 by weight.

EXAMPLE 17

100 Grams of the solution of Example 16 was diluted to about 3% solids by adding and admixing therewith 194 cc of water. To this was added, with mixing, 1.6 grams of sodium hydroxide dissolved in 96 cc of water. The resulting solution had a resins solids content of about 2% and a pH of about 11.4.

EXAMPLE 18

A 50:50 by weight mixture of Rayonier bleached kraft pulp and Weyerhaeuser bleached hardwood pulp was beaten to Canadian standard freeness of 500 cc in a Noble and Wood cycle beater. The pulp was then adjusted to pH 7.5 with 10% NaOH and an amount, as specified in Table VIII, based on the dry weight of pulp of the polyaminopolyamide—epichlorohydrin resin, prepared as described in Example 16 was added by using the solution of Example 17. The pulp was sheeted on a Noble and Wood handsheet machine. A portion of the resulting handsheets were heated for 30 minutes at 80° C. to cure the resin. The sheets (cured and uncured) tested for wet strength were soaked for two hours in distilled water. Results are listed in Table VIII.

EXAMPLE 19

The apparatus employed in this example was a 1-liter resin kettle (reaction flask) with head fitted with a Dean-Stark trap, a water condenser, a nitrogen sparge, an anchor stirrer, and a thermometer.

Methylbisaminopropylamine, 145.3 grams (1 mole), was placed in the resin kettle and heated to 160° C. Diethylmalonate, 160.2 grams (1 mole), was then added to the resin kettle dropwise keeping the temperature of the reaction mass between about 160° C. and 163° C. After addition was complete, the temperature of the reaction mass was allowed to rise to about 185°–192° C. over a period of about 45 minutes. The polyaminopolyamide reaction product was poured into an aluminum pan and cooled to room temperature (about 25° C.). The yield of polyaminopolyamide was 168.7 grams.

EXAMPLE 20

46 Grams of the polyaminopolyamide of Example 19, 112 cc of water, and 22.7 grams of 37.3% aqueous HCl were thoroughly admixed to provide 30% aqueous solution of the resulting salt, the pH of the solution being about 1.5 83.6 Grams of this solution was placed into a reaction flask fitted as in Example 19. The pH of the solution was adjusted to 8.75 by adding 3.5 cc of 10 molar NaOH. Epichlorohydrin, 13.9 grams, was added followed by 32 cc of water to give 30% reaction solids. The temperature of the resulting solution, which was at room temperature (about 25° C.), was raised to 45°–46° C. and the viscosity of the solution monitored. When the Gardner-Holdt viscosity reached F, 259 cc of water was added and the pH was adjusted to 1.6 with 10 molar HCl. The pH was adjusted to 2 by the addition of 3.2 cc of 10 molar HCl. The resulting solution had a solids content of about 9.08% by weight.

EXAMPLE 21

100 Grams of the solution of Example 20 was diluted to about 3% solids by adding and admixing therewith 233 cc of water. To this was added, with mixing, 1.45 grans of sodium hydroxide dissolved in 114 cc of water. The resulting solution had a resin solids content of about 2% and a pH of about 11.

EXAMPLE 22

Using the resin solution of Example 21, paper sheets were prepared and the wet-strength properties thereof were tested in accordance with the procedure of Example 18. Results are listed in Table VIII.

TABLE VIII

| | | | Tensile Strength (lbs./in.) | | | | |
| | | | 1 Day Natural Aging (Uncured) | | | Heated 30 mins. @ 80° C. (Cured) | | |
| Resin of | % Resin Added | Basis Wt. | Dry | Wet | % Wet/Dry | Dry | Wet | % Wet/Dry |
|---|---|---|---|---|---|---|---|---|
| Exam. 16 | 1.0 | 40.1 | 19.9 | 3.43 | 17.2 | 21.4 | 5.13 | 24.0 |
| Exam. 20 | 0.75 | 39.6 | 20.1 | 3.64 | 18.1 | 20.7 | 4.99 | 24.1 |

EXAMPLE 23

The papers of Examples 18 and 22, both uncured and cured, were repulped, in a TAPPI disintegrator, in 185° F. aqueous NaOH at a pH of 12. Degree of repulping of the sheets is set forth in Table IX below. In the table the degree is measured in integers 1–6, the integer 6 indicating complete repulping.

TABLE IX

| | Degree of Repulping After Minutes | | | | | | |
| Paper of | 5 | 10 | 20 | 30 | 40 | 50 | 60 |
|---|---|---|---|---|---|---|---|
| Example 18 (Uncured Resin) | 2 | 5 | 6 | | | | |
| Example 22 (Uncured Resin) | <1 | <1 | <1 | 1 | 1 | 2 | 2 |
| Example 18 (Cured Resin) | 1 | 4 | 5 | 6 | | | |
| Example 22 (Cured Resin) | <1 | <1 | <1 | <1 | 1 | 1 | 2 |

As will be apparent to one skilled in the art wet-strength paper containing the novel resin of this invention, uncured or cured, is more easily repulped than paper containing a resin prepared from the ester of malonic acid, the next higher homolog of oxalic acid.

From the above it is apparent to one skilled in the art that the resin of this invention imparts good wet-strength to paper and, in addition, that it can be repulped using relatively mild repulping conditions.

It is to be understood that the resin solutions prepared in accordance with this invention can be used to impart wet-strength to paper without first being stabilized against premature gelation followed by reactivation with base. Thus, if the resin solution is to be used promptly there is no need to go through the stabilization and reactivation steps. However, as is usually the case, the resin solution will be stored for a period of time prior to use, during which time premature gelation can occur. Thus, it is recommended that pH adjustment to insure against premature gelation be made during the manufacturing process.

The above description and working examples are illustrative of this invention and not in limitation thereof.

What I claim and desire to protect by Letters Patent is:

1. A method of preparing an aqueous solution of a water-soluble, cationic thermosetting resin which consists essentially of reacting methylbisaminopropylamine and a diester of oxalic acid to form a polyaminopolyamide containing tertiary amines, the mole ratio of amine to diester being from about 0.9:1 to about 1.2:1 and then reacting the polyaminopolyamide in aqueous solution in the form of its acid salt with an epihalohydrin, said acid salt being prepared by adding to an aqueous dispersion of the polyaminopolyamide a water-soluble acid in an amount essentially stoichiometrically equivalent to the tertiary amines of the polyaminopolyamide, the amount of epihalohydrin employed being from about 1 mole to about 1.5 moles per mole of tertiary amine of the polyaminopolyamide.

2. The method of claim 1 wherein the epihalohydrin is epichlorohydrin.

3. The method of claim 2 wherein the diester is diethyl oxalate.

4. The method of claim 1 wherein, after reaction of the epihalohydrin with the polyaminopolyamide, the aqueous solution is adjusted to and maintained at a pH of from about 2 to about 3.

5. The method of claim 2 wherein, after reaction of epichlorohydrin with the polyaminopolyamide, the aqueous solution is adjusted to and maintained at a pH of from about 2 to about 3.

6. The method of claim 3 wherein, after reaction of epichlorohydrin with the polyaminopolyamide, the aqueous solution is adjusted to and maintained at a pH of from about 2 to about 3.

7. A water-soluble, cationic thermosetting resin derived by reacting methylbisaminopropylamine and a diester of oxalic acid to form a polyaminopolyamide containing tertiary amines, the mole ratio of amine to diester being from about 0.9:1 to about 1.2:1 and then reacting the polyaminopolyamide, in aqueous solution, in the form of its acid salt with an epihalohydrin, said acid salt being prepared by adding to an aqueous dispersion of the polyaminopolyamide a water-soluble acid in an amount essentially stoichiometrically equivalent to the tertiary amines of the polyaminopolyamide, the amount of epihalohydrin employed being from about 1 mole to about 1.5 moles per mole of tertiary amine of the polyaminopolyamide.

8. The resin of claim 7 wherein the epihalohydrin is epichlorohydrin.

9. The resin of claim 8 wherein the diester is diethyl oxalate.

10. An aqueous solution of the resin of claim 7.

11. An aqueous solution of the resin of claim 8.

12. An aqueous solution of the resin of claim 9.

13. The aqueous solution of claim 10 wherein the pH thereof is from about 2 to about 3.

14. The aqueous solution of claim 11 wherein the pH thereof is from about 2 to about 3.

15. The aqueous solution of claim 12 wherein the pH thereof is from about 2 to about 3.

* * * * *